United States Patent
Meidhof et al.

(10) Patent No.: US 6,779,429 B2
(45) Date of Patent: Aug. 24, 2004

(54) KNIFE ARRANGEMENT FOR A GRANULATOR FOR GRANULATING PLASTIC ROPES

(75) Inventors: Helmuth Meidhof, Grossostheim (DE); Stefan Dahlheimer, Kleinostheim (DE); Jürgen Van Marwick, Frankfurt (DE)

(73) Assignee: Reiter Automatik GmbH, Grossostheim (DE)

( * ) Notice: Subject to any disclaimer, the term of this patent is extended or adjusted under 35 U.S.C. 154(b) by 0 days.

(21) Appl. No.: 10/053,700

(22) Filed: Jan. 24, 2002

(65) Prior Publication Data

US 2002/0100355 A1 Aug. 1, 2002

(30) Foreign Application Priority Data

Jan. 29, 2001 (DE) .......................................... 101 03 827

(51) Int. Cl.[7] .............................................. B26D 1/147
(52) U.S. Cl. ............................... 83/674; 83/111; 83/906; 241/185.5
(58) Field of Search .......................... 83/674, 906, 628, 83/111; 241/224, 221, 24.18, 89.3, 89.4, 171, 185.5

(56) References Cited

U.S. PATENT DOCUMENTS

| | | | | |
|---|---|---|---|---|
| 2,739,647 A | * | 3/1956 | Coste .......................... | 83/356.3 |
| 3,650,168 A | * | 3/1972 | Ruschmann .................. | 83/114 |
| 4,474,336 A | * | 10/1984 | Fleming ..................... | 241/221 |
| 4,759,248 A | * | 7/1988 | Muller et al. ................. | 83/349 |
| 4,960,020 A | * | 10/1990 | Reinhard ....................... | 83/34 |
| 5,313,864 A | * | 5/1994 | Forgash et al. ................ | 83/349 |
| 5,474,435 A | * | 12/1995 | Hunke .......................... | 425/71 |
| 5,634,601 A | * | 6/1997 | Hild et al. ................... | 241/224 |
| 5,888,554 A | * | 3/1999 | Zollitsch et al. .............. | 425/71 |
| 6,347,932 B1 | * | 2/2002 | Kim ............................ | 425/71 |

FOREIGN PATENT DOCUMENTS

| | | |
|---|---|---|
| DE | 29 01 018 | 7/1980 |
| WO | WO 94/09958 | 11/1994 |

* cited by examiner

Primary Examiner—Allan N. Shoap
Assistant Examiner—Phong Nguyen
(74) Attorney, Agent, or Firm—Banner & Witcoff, Ltd.

(57) ABSTRACT

Knife arrangement for a granulator for granulating plastic ropes with two draw-in rollers and a cutting rotor (9) cooperating with a counter-knife (2), and a striper (3) facing one of the draw-in rollers (11), whereby counter-knife (2) and striper (3) are mounted on a common support, whereby the striper (3) is arranged adjustably for adjustment of the distance between the striper (3) and the draw-in roller (11), and whereby the striper (3) has a support surface (6) for feeding the plastic ropes (12) to the counter-knife (2) and the cutting rotor (9), and is provided on one side with a striper edge (18) projecting towards the draw-in roller (11), and on its other side with an end edge (7) projecting towards the counter-knife (2), whereby the support (1) has a support surface (4) facing the striper (3), on which the striper (3) rests with a counter surface (5) adapted to the support surface (4), whereby support surface (6) and counter surface (5) approach each other towards the counter-knife (2) in a wedge-shaped manner, such that the end edge (7) is formed cutting edge-like, and the striper (3) together with the support (1) reaches the counter-knife (2) essentially continuously.

3 Claims, 5 Drawing Sheets

KNIFE ARRANGEMENT FOR A GRANULATOR FOR GRANULATING PLASTIC ROPES

Figure 1:
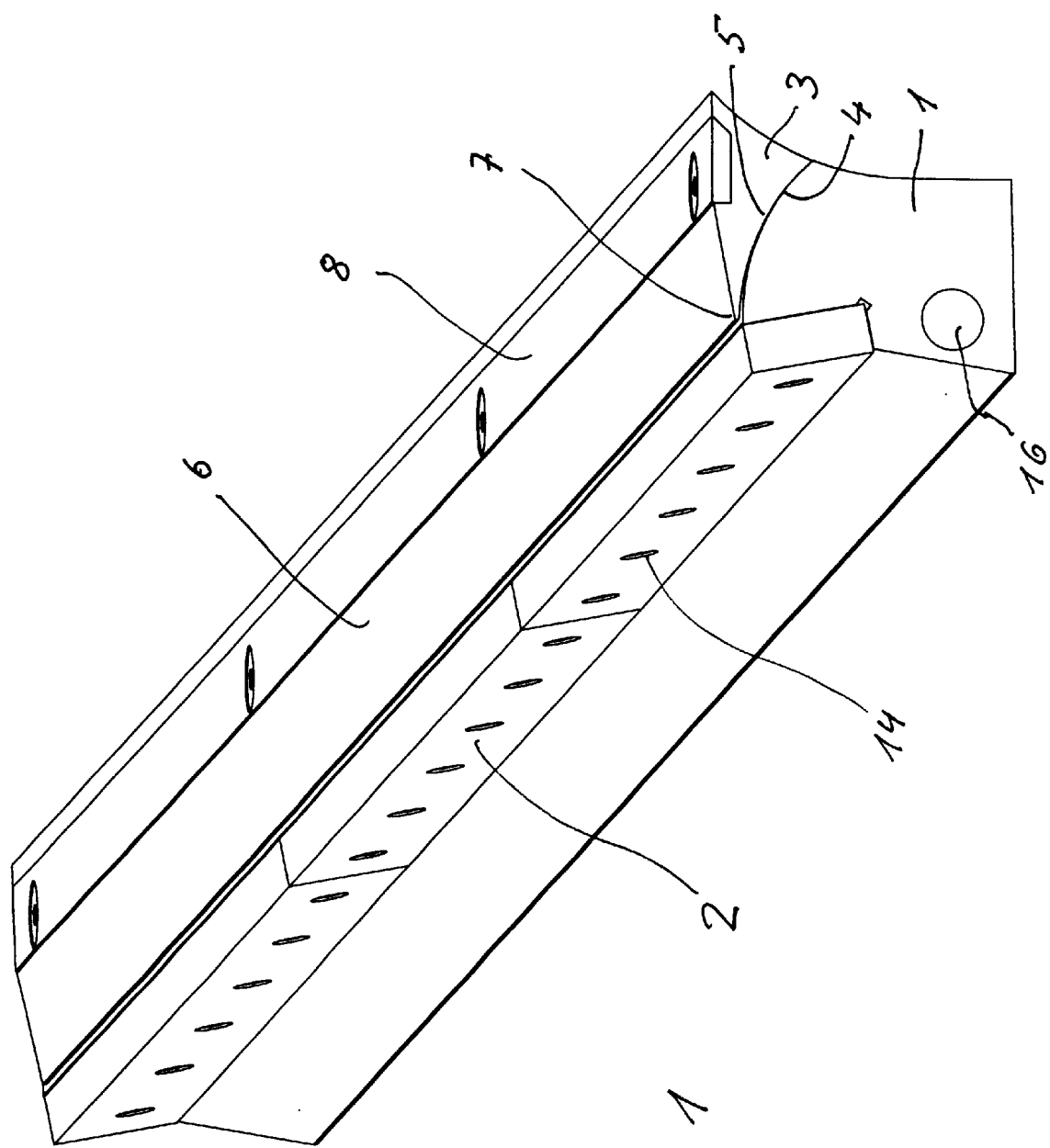

The invention refers to a knife arrangement for a granulator for granulating plastic ropes with two draw-in rollers and a cutting rotor cooperating with a counter-knife and a stripper opposing one of the draw-in rollers, whereby counter-knife and stripper are mounted on a common support, the stripper is arranged adjustably for adjusting the distance between the stripper and the draw-in roller, and the stripper has a support surface for feeding the plastic ropes to the counter-knife and to the cutting rotor, and is provided on its one side with a stripping edge facing the draw-in roller, and on its other side with an end edge facing the counter-knife.

Such knife arrangements are in permanent use. With these, the stripper is adapted to be displaced into the direction of the corresponding draw-in roller due to a corresponding fastening on the support, whereby it moves away from the counter-knife. Such a displacement is, e.g., necessary, if the cutting rotor and the counter-knife have to be resharpened due to wear, leading also to a displacement of the stripper relative to its associated draw-in roller. To recover the original relative position of draw-in roller and stripper, the stripper has to be displaced accordingly in the direction towards the draw-in roller.

The invention is based on the object, to configure the knife arrangement with the stripper such that during displacement of the stripper carrying at the same time above itself plastic ropes which are fed to the counter-knife, to keep its support surface serving for this in such a relative position to the counter-knife that the function of the support surface is practically preserved whereby the supply of the ropes to the counter-knife is not influenced by an adjustment of the stripper.

According to the invention, this results from the support having a support surface facing the stripper on which the stripper rests with a counter surface adapted to one of the support surfaces, whereby support surface and counter surface approach each other in the direction towards the counter-knife in a wedge-shaped manner, that the end edge is formed like a cutting edge, and the stripper, together with the support, reaches the counter-knife essentially continuously.

Due to the support surface and the correspondingly formed counter surface of the stripper with its cutting edge-like tapering end edge facing the counter-knife, a guidance of the plastic ropes results during displacement of the stripper, which thereby are supported on a base which, during displacement of the stripper, forms a slight kink only in cross-sectional view without gap formation, such that the guidance of the plastic ropes remains totally uninfluenced by a displacement of the stripper. Thereby, the advantageous property results that due to the cutting edge like tapering end edge of the stripper, also during its displacement away from the counter-knife, practically no gap and no spacing, respectively, is formed in the area between the end edge and the counter-knife, in which dust, dirt, and also plastic material can be accumulated, leading to an impairment of the uniform guidance of the plastic ropes over the stripper. The also makes a special cleaning in the area of the stripper and counter-knife superfluous, which is especially important in a continuous operation of a granulator.

Advantageously, the support and the stripper are constructed such that the support surface has a curvature running in a circular shape in cross-section, and the counter surface of the stripper has the same radius as the support surface. The guidance of the stripper during its displacement can be constructed in an advantageous manner as rotation around an axis, coinciding approximately with the center of the arc of a circle defining the support surface.

It is also possible to construct the support surface and the counter surface such that both run planar which is particularly advantageous with respect to manufacturing techniques.

Figure 2:
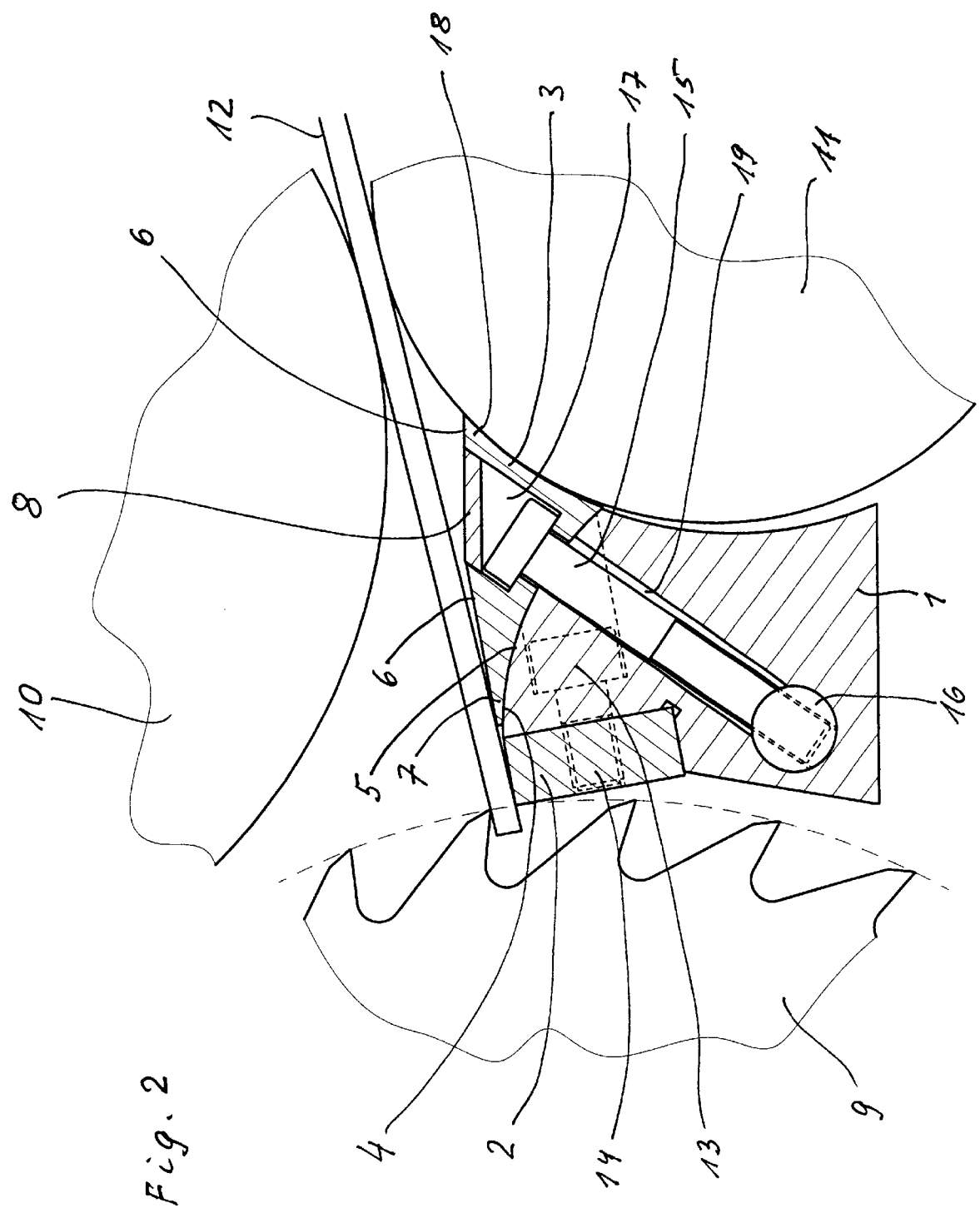
Figure 3:
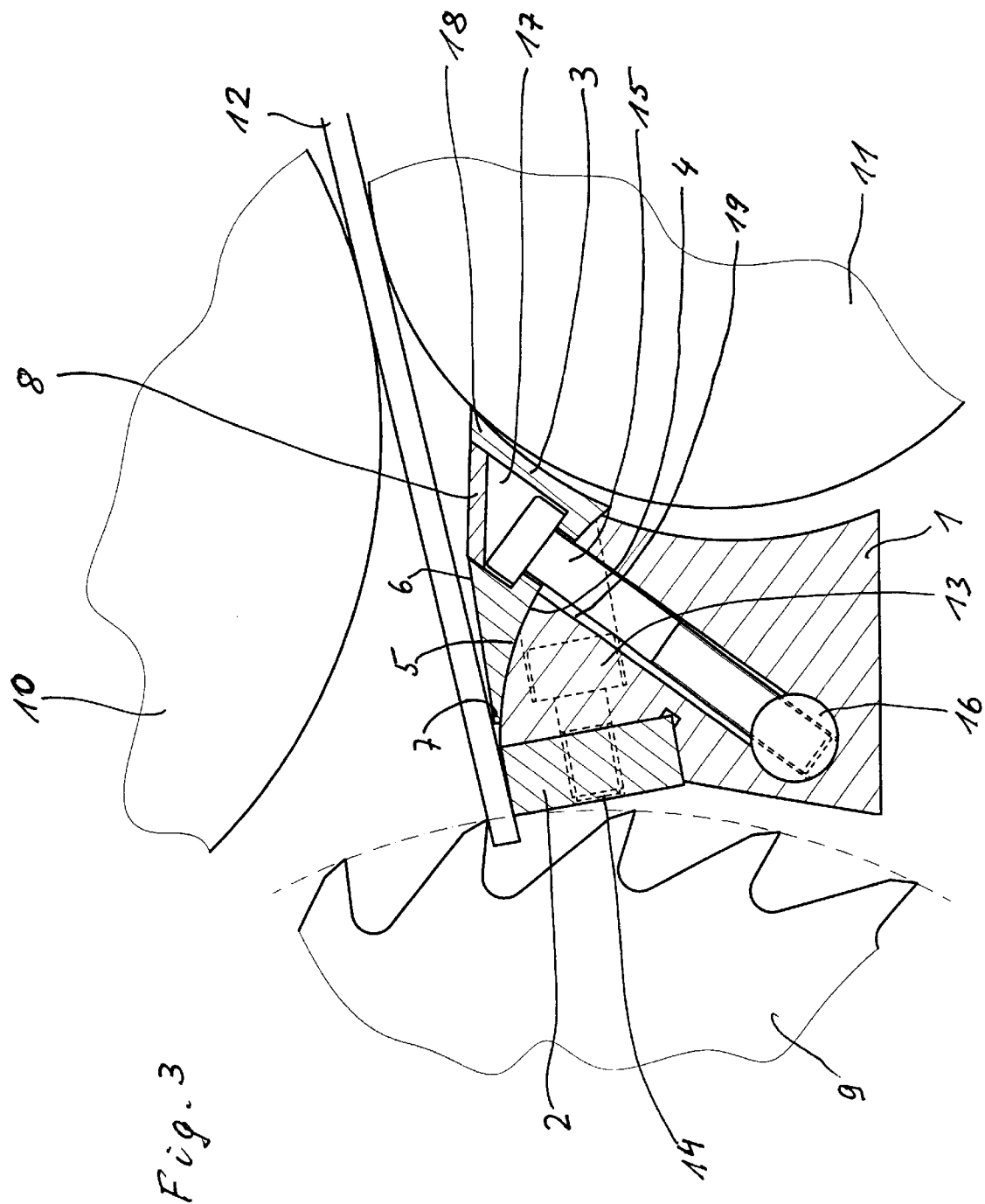
Figure 4:
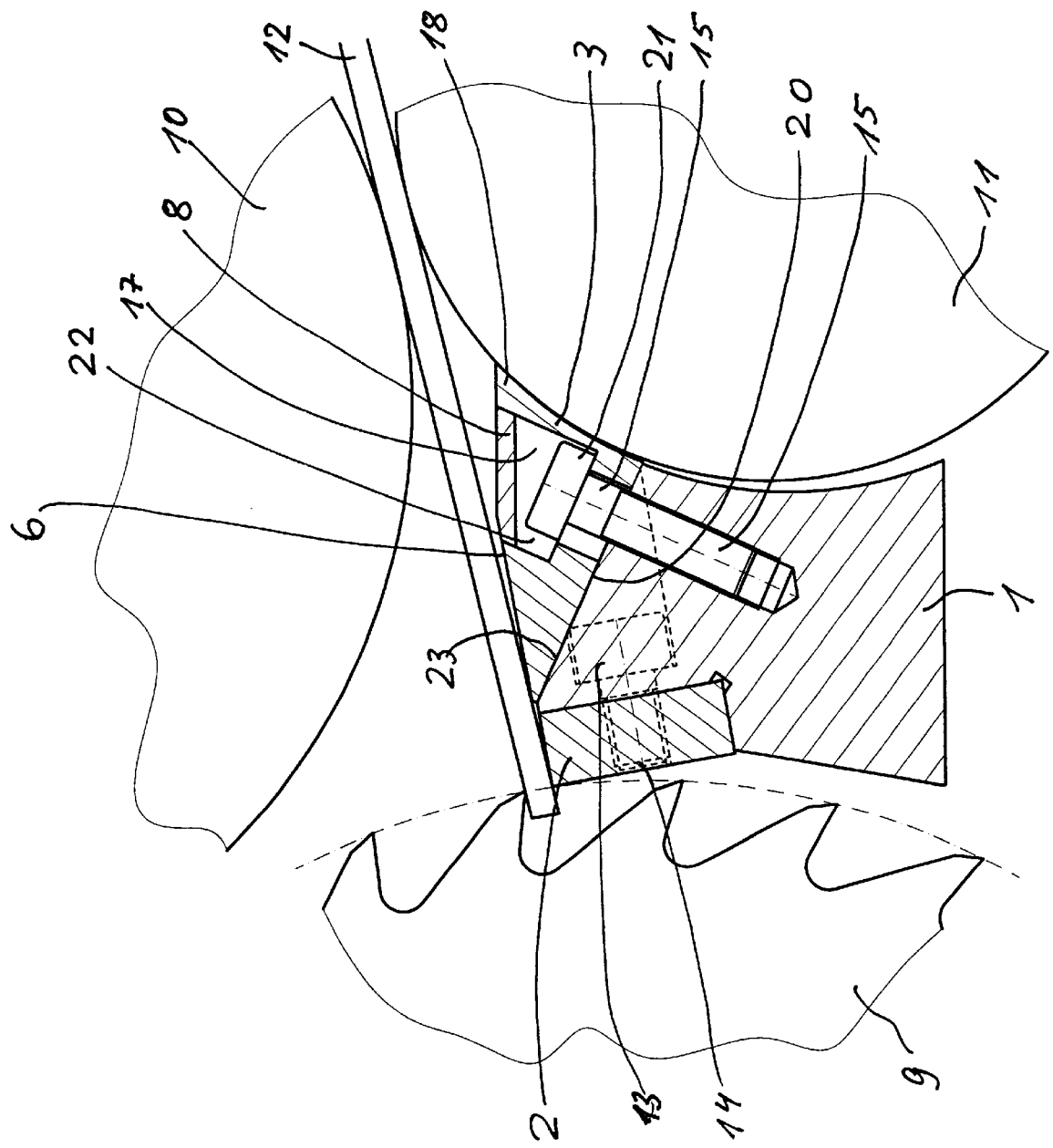
Figure 5:
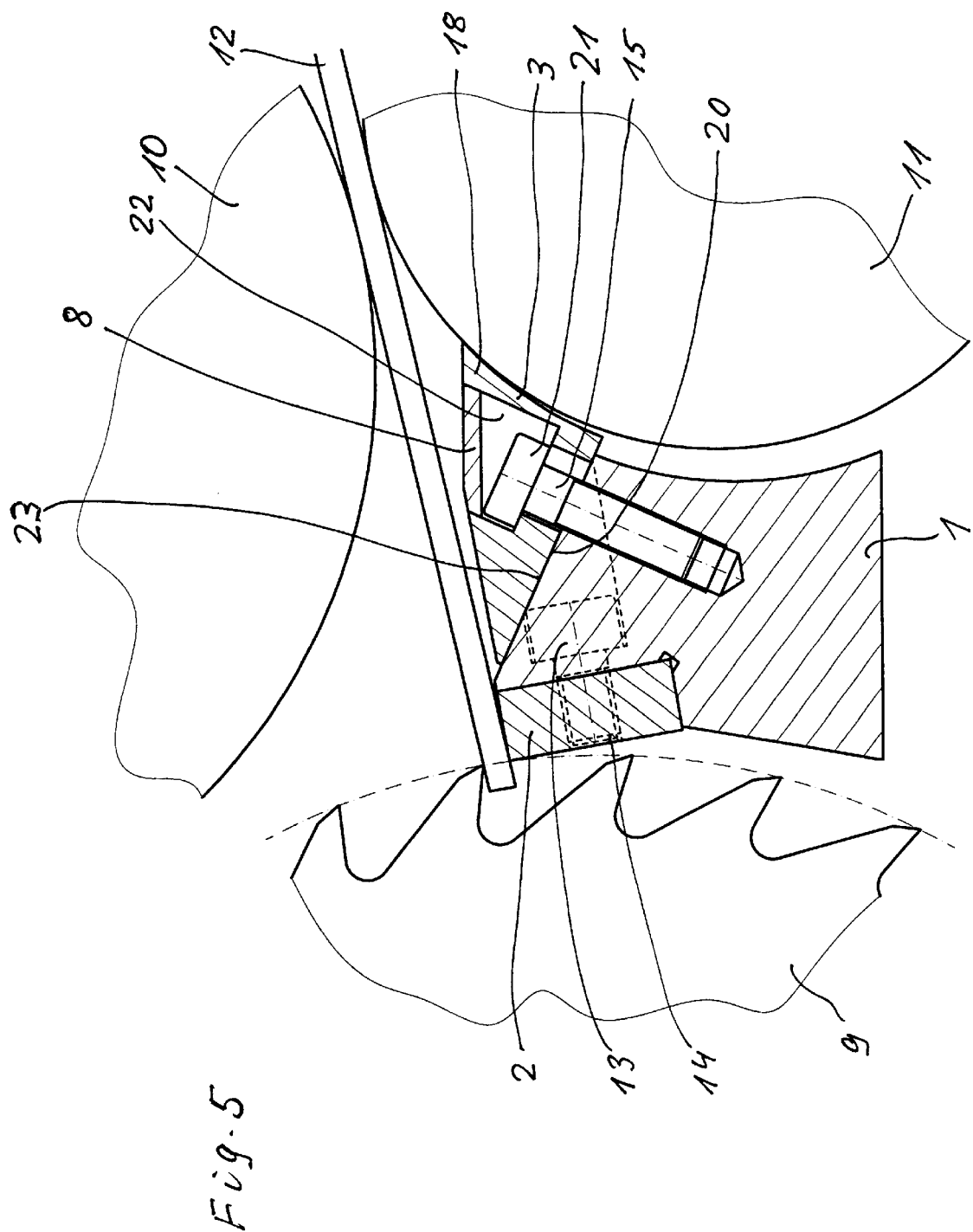

Embodiments of the invention are illustrated in the Figures, showing:

FIG. 1 a knife arrangement with curved support surface and counter surface in perspective view, FIG. 2 the same knife arrangement in sectional view with readjusted stripper, FIG. 3 the same knife arrangement with readjusted stripper, FIG. 4 a knife arrangement with planar support surface and counter surface, and, in fact, with stripper not being readjusted, FIG. 5 the same knife arrangement with readjusted stripper.

The knife arrangement shown in FIG. 1 has a common support 1, onto which the counter-knife 2 and the stripper 3 are mounted. Support 1 has a support surface 4, having a curvature running circular in its cross-section (see hereto FIG. 2). On this surface 4, stripper 3 rests with a counter surface 5 adapted to one of support surfaces 4. Stripper 3 has a height in cross-sectional direction, measured from its counter surface 5 to its support surface 6, decreasing into the direction towards the one side of stripper 3 facing counter-knife 2, such that a cutting edge-like formed end edge 7 results at the corresponding end of the stripper 3. This end edge 7 opposes directly the rearward side of the counter-knife 2, and forms therewith the transition position of stripper 3 to counter-knife 2, leading, due to its cutting edge-like shape, to a practically continuous transition of support surface 6 to counter-knife 2. If now, stripper 3 is displaced from the original position, displayed in FIG. 1, into a modified position for the purpose of allowing for a resharpening of cutting rotor 9, then this results in such a manner that end edge 7 moves away slightly from counter-knife 2 whereby, in the area between end edge 7 and counter-knife 2, practically no step or gap results, because, as outlined previously, the cutting edge-like formed end edge 7 moves back on support surface 4 of support 1, formed in cross-section in circular shape whereby a practically continuous transition from support surface 6 of stripper 3 to the counter-knife 2 remains, and accordingly, the guidance of plastic ropes 12 (see FIGS. 2 and 3) over support surface 6 is not influenced.

Further, the capping 8 is shown in FIG. 1 and the surface of a holding rod 16 is displayed, which will be discussed in detail in context with the explanations concerning FIG. 2.

In the sectional view according to FIG. 2, the surfaces of cutting rotor 9 and the two draw-in rollers 10 and 11 are displayed. The two draw-in rollers 10 and 11 guide plastic ropes 12 (due to the sectional view, only one rope 12 can be seen in FIG. 2) to cutting rotor 9, cooperating with counter-knife 2, and cutting the plastic ropes 12 into granulate in a known manner. Counter-knife 2 is mounted on support 1, and, in fact, by means of the non-visibly drawn screws 13, the surfaces 14 of which penetrate counter-knife 2, and, thus, as shown in FIG. 1, are visible on the side facing cutting rotor 9. Stripper 3 is mounted on support 1 and, in fact, with a number of bolts 15, being arranged distributedly across the length of stripper 3, to ensure the uniform fixing of stripper 3 on support 1. Bolts 15 end in a holding rod 16 penetrating support 1 across its length, which is inserted into a corresponding bore of support 1. Location hole 17 stripper 3 for bolts 15 is closed by capping 8 such that a planar support surface 6 results for the plastic ropes 12 supplied.

Stripper 3 faces with a very slight gap with its stripper edge 18 the surface of draw-in roller 11 (not shown in FIGS. 2 and 3) such that stripper 3 cleans these during rotation of draw-in roller 11 continuously by stripping off any adhered foreign substances.

In case that support 1 has to be displaced in the direction towards cutting rotor 9, due to wear of cutting rotor 9 and counter-knife 2, respectively, and the necessary resharpening of these components, which is always necessary and provided for in a known manner for such knife arrangements, then a gap would result between stripper edge 18 and draw-in roller 11 without a corresponding counter displacement of stripper 3, whereby stripper 3 could no longer fulfill its function. To compensate for this displacement of support 1, stripper 3 is displaced on the support surface 4 of support 1 in a direction away from cutting rotor 9, and thus is readjusted, after loosening bolts 15 of stripper 3, whereby only a few millimeters are concerned due to the thereby necessary readjustments. Stripper 3 turns back again into its position displayed in FIG. 3, in which stripper edge 18 nearly contacts the surface of draw-in roller 11. Thereby, due to the cutting edge-like formed end edge 7 of stripper 3, at the corresponding position, practically no essential step results, such that also ropes 12 are supplied as previously over a practically continuous support surface 6 to cutting rotor 9. Bolts 15 can also carry out these displacement movements, because as FIGS. 2 and 3 show clearly, they are provide with a corresponding positive allowance 19 in bores provided in support 1.

In FIG. 3, the illustration according to FIG. 2 is modified such that FIG. 3 shows the knife arrangement according to FIG. 2 with readjusted stripper. With this readjustment from the position according to FIG. 2 to the position according to FIG. 3, bolts 15, as a comparison of both Figs. shows clearly, are pivoted around the length of their positive allowances 19, and, in fact, around the axis of holding rod 16, whereby the end edge 7 of stripper 3 is moved away from counter-knife 2 accordingly.

The knife arrangement according to FIG. 4 differs from the one according to FIGS. 1 to 3 only in that the support surface 20 of support 1 and the counter surface 23 adapted to the latter of stripper 3 run planar. Thereby, FIG. 4 shows the knife arrangement in a position not readjusted. The positive allowance for the readjustment is given thereby that head 21 of bolts 15 is held with positive allowance 22 within a location hole 17 such that in the area of this positive allowance 22, stripper 3 can be moved away from counter-knife 2.

FIG. 5 shows the same knife arrangement as FIG. 4, but with displaced stripper 3. Further, with respect to the function of the knife arrangement according to FIGS. 4 and 5, it is referred to FIGS. 1 to 3 and the corresponding explanations.

For the supply of ropes 12 to cutting rotor 9, the feeding conditions during displacement of stripper 3 remain unchanged, which is of special importance for the quality of the granulate to be produced. Moreover, the knife arrangement according to the invention has a high stability in its area of support 1 and stripper 3.

What is claimed is:

1. Knife arrangement for a granulator for granulating plastic ropes cooperating with two draw-in rollers and a cutting rotor (9) comprises a counter-knife (2), and a stripper (3) facing one of the draw-in rollers (11), whereby the counter-knife (2) and the stripper (3) are mounted on a common support (1), whereby the stripper (3) is arranged adjustably for adjustment of the distance between the stripper (3) and the draw-in roller (11), and whereby the stripper (3) has a support surface (6) for feeding the plastic ropers (12) to the counter-knife (2) and the cutting rotor (9), and is provided on one side with a stripper edge (18) projecting towards the draw-in roller (11), and on its other side with an end edge (7) projecting towards the counter-knife (2), characterized in that the support (1) has a support surface (4) facing the stripper (3), on which the stripper (3) rests with a counter surface (5) adapted to the support surface (4), whereby the support surface (6) and the counter surface (5) approach each other towards the counter-knife (2) in a converging wedge-shaped manner such that the end edge (7) is formed as a narrow edge, and the stripper (3) together with the support (1) reaches the counter-knife (2) essentially continuously with a minimal gap between the stripper (3) and the counter-knife (2), the counter-knife (2) fitting in a groove, said gap being adjacent to said groove.

2. Knife arrangement according to claim 1, characterized in that the support surface (4) has a curvature running circular in cross-section, and the counter surface (5) of the stripper has the same radius as the support surface (4).

3. Knife arrangement according to claim 1, characterized in that the support surface (4) and the counter surface (5) of the stripper (3) run planar.

* * * * *

UNITED STATES PATENT AND TRADEMARK OFFICE
CERTIFICATE OF CORRECTION

PATENT NO.    : 6,779,429 B2
DATED         : August 24, 2004
INVENTOR(S)   : Helmuth Meidhof, Stefan Dahleimer and Jürgen Van Marwick It is certified that error appears in the above-identified patent and that said Letters Patent is hereby corrected as shown below:

Column 4,
Line 25, replace "ropers" with -- ropes --.

Signed and Sealed this

Eleventh Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,779,429 B2 Page 1 of 1
APPLICATION NO. : 10/053700
DATED : August 24, 2004
INVENTOR(S) : Helmuth Meidhof et al.

It is certified that error appears in the above-identified patent and that said Letters Patent is hereby corrected as shown below:

On Title Page
Item (73) Assignee: replace "Reiter" with --Rieter--.

Signed and Sealed this

Sixteenth Day of January, 2007

JON W. DUDAS
*Director of the United States Patent and Trademark Office*